United States Patent [19]

Tsuda et al.

[11] Patent Number: 5,760,370
[45] Date of Patent: Jun. 2, 1998

[54] IMAGE DISPLAY METHOD FOR LIQUID CRYSTAL MASK LASER MARKER

[75] Inventors: Yukihiro Tsuda; Yukinori Matsumura, both of Isehara, Japan

[73] Assignee: Komatsu Ltd., Tokyo, Japan

[21] Appl. No.: 687,467

[22] PCT Filed: Feb. 6, 1995

[86] PCT No.: PCT/JP95/00149

§ 371 Date: Aug. 7, 1996

§ 102(e) Date: Aug. 7, 1996

[87] PCT Pub. No.: WO95/21717

PCT Pub. Date: Aug. 17, 1995

[30] Foreign Application Priority Data

Feb. 8, 1994 [JP] Japan ................... 6-034228

[51] Int. Cl.⁶ .................................. B23K 26/06
[52] U.S. Cl. .................. 219/121.73; 219/121.85; 349/2
[58] Field of Search ............ 219/121.68, 121.69, 219/121.73, 121.85; 349/2–4, 19, 33; 347/224, 256

[56] References Cited

U.S. PATENT DOCUMENTS 4,734,558  3/1988  Nakano et al. ............... 219/121.73
4,818,835  4/1989  Kuwabara et al. ............ 219/121.85
5,157,235  10/1992 Okumura et al. ............. 219/121.68
5,309,273  5/1994  Mori et al. .................. 219/121.68

FOREIGN PATENT DOCUMENTS

| 316801 | 5/1989 | European Pat. Off. |
| 5-42379 | 10/1985 | Japan |
| 1-134497 | 5/1989 | Japan |
| 5-210358 | 8/1993 | Japan |
| 6-155054 | 6/1994 | Japan |

*Primary Examiner*—Teresa J. Walberg
*Assistant Examiner*—Gregory L. Mills
*Attorney, Agent, or Firm*—Sidley & Austin

[57] ABSTRACT

An image display method for a liquid crystal mask marker displays an image of a high sharpness even when the marking speed is high. To this end, when the display image of a liquid crystal mask (4) is to be rewritten, the method includes performing at least one of (a) making all of the opaque picture elements (B) of the current image (P1) to become transparent, and (b) making all of the transparent picture elements (A) of the current image (P1) to become opaque; then making the electrodes of all of the picture elements (A,B) to be grounded or set equipotentially; and then starting the display of the next image (P2).

20 Claims, 3 Drawing Sheets

IMAGE DISPLAY METHOD FOR LIQUID CRYSTAL MASK LASER MARKER

TECHNICAL FIELD

The present invention relates to an image display method for a liquid crystal mask marker, and more particularly to an image display method for a liquid crystal mask marker which can clearly display and imprint mask images, such as product numbers and patterns, on the surfaces of nonmetallic articles, such as IC chips, or metallic articles.

BACKGROUND ART

A prior art liquid crystal mask marker will be described with reference to FIG. 5. A high-density energy light beam R1 emitted from a laser oscillator 1, for example, is irradiated onto a display image of a liquid crystal mask 4, and a light beam R2 transmitted through the mask 4 is then irradiated onto a workpiece surface 6 for imprinting the image on the workpiece surface 6. According to Japanese Patent Laid-Open No. 5-210358, for example, the display image of the liquid crystal mask 4 is rewritten with a controller 8 in such a manner that, as shown in FIG. 6B, potentials of all of the picture elements are grounded as indicated by S, i.e., voltages applied to all of the picture elements are made zero, and the step of displaying the next display image P is then started (this rewriting process will be hereinafter referred to as "process of grounding potentials of all of the picture elements").

With the process of grounding potentials of all of the picture elements, there occur phenomena, called an afterimage and a counter afterimage described later, in the display image of the liquid crystal mask 4 immediately after the rewriting. Referring to FIGS. 7A to 7C, for example, when a solid black circle A (FIG. 7A) is marked on the workpiece surface 6 and, after rewriting the display image of the liquid crystal mask 4, a solid black rectangle B (FIG. 7B) is marked on the workpiece surface 6, a rectangle C appears, together with an afterimage A2, as the image of the liquid crystal mask 4 immediately after the rewriting, as shown in FIG. 7C. In addition, the rectangle C is divided into a clear area A1 and an unclear area B1. This unclear area B1 is defined here as "counter afterimage". Incidentally, the letter B indicates an area of the image other than the circle A.

The afterimage A2 and the counter afterimage B1 will disappear naturally with the elapse of time. Therefore, those phenomena are practically not problematic in conventional liquid crystal mask markers which are much inferior in marking speed and image sharpness to the present liquid crystal mask marker described later. More specifically, in conventional liquid crystal mask markers, the high-density energy light beam R1 is irradiated onto the image including both the afterimage A2 and the counter afterimage B1. But when the image is imprinted on the workpiece surface, the counter afterimage B1 does not raise a problem because the irradiation time is long. On the other hand, the afterimage A1 does not appear as imprinted on the workpiece surface by irradiating the high-density energy light beam R1 onto the image in which the afterimage A2 has disappeared. It is to be noted that the counter afterimage B1 will not also appear as imprinted on the workpiece surface if the high-density energy light beam R1 is, as with the above case of the afterimage A2, irradiated onto the image in which the counter afterimage B1 has disappeared. In practice, however, no considerations have been paid so far to the foregoing point and the level of sharpness of the image imprinted does not yet deserve discussing in the present state of art.

Meanwhile, the applicant has previously proposed several liquid crystal mask markers (see, e.g., Japanese Patent Laid-Open No. 5-42379) wherein the rewriting time and the image display time are each on the order of about 30 msec at the minimum, i.e., an image is displayed and rewritten at very high speeds, while ensuring a sharpness of the image imprinted. Accordingly, the irradiation time of a high-density energy light beam (i.e., the marking time) during the image display time is even shorter. In the proposed liquid crystal mask markers, not only the afterimage A2 and the counter afterimage B1, but also the timing at which the high-density energy light beam R1 is irradiated onto an image, bring about a great effect on achievement of a high marking speed and a high image sharpness.

Thus, such a liquid crystal mask marker with a high marking speed and a high image sharpness causes a problem as follows. If the processing of an afterimage, the processing of a counter afterimage, and the irradiation timing of a high-density energy light beam are inappropriate, the afterimage A2 and the counter afterimage B1 as shown in FIG. 7C would appear distinctly as imprinted on the workpiece surface because of a capability of the marker to display an image of a high sharpness.

SUMMARY OF THE INVENTION

The present invention has been accomplished with a view of solving the above-stated problem in the prior art, and its object is to provide an image display method for a liquid crystal mask marker which can display an image of a higher sharpness at a higher speed with more reliability, taking into account the processing of an afterimage, the processing of a counter afterimage, and the irradiation timing of a high-density energy light beam.

According to a first invention of this application, an image display method for a liquid crystal mask marker is featured in that when a display image of a liquid crystal mask is rewritten, all of the picture elements of a current image are made transparent, then the electrodes of all of the picture elements are grounded or set equipotentially, and thereafter the step of displaying a next image is started.

According to a second invention of this application, an image display method for a liquid crystal mask marker is featured in that when a display image of a liquid crystal mask is rewritten, all of the picture elements of a current image are made opaque, then the electrodes of all of the picture elements are grounded or set equipotentially, and thereafter the step of displaying a next image is started.

According to a third invention of this application, an image display method for a liquid crystal mask marker is featured in that when a display image of a liquid crystal mask is rewritten, the states of the picture elements of a current image are reversed such that transparent picture elements are made opaque and opaque picture elements are made transparent, then the electrodes of all of the picture elements are grounded or set equipotentially after the above reversing step, and thereafter the step of displaying a next image is started.

Prior to describing the operation of the foregoing first to third inventions, a description will be first made of the results of analysis made by the inventors on the above-stated problem in the prior art. In FIG. 4 which is an analytic graph for the prior art, the reference numerals in FIGS. 7a to 7c are also employed. It is here assumed that a current image P1, comprising a transparent area A and an opaque area B, is rewritten with the prior art process of grounding the potentials of all of the picture elements and the step of displaying a next image P2 is then started. The next image P2 has a transparent area comprising one portion A1 of the area A and one portion B1 of the area B, and an opaque area comprising the other portion A2 of the area A and the other portion B2 of the area B. FIG. 4 is a correlative graph between the transmittance of each picture element in A, B, A1, A2, B1, and B2 and the time in the steps of displaying the current image P1, rewriting the image, and displaying the next image P2. The graph of FIG. 4 also indicates the timing Ts to start the irradiation by a high-density energy light beam and the irradiation time T. The sharpness of an image imprinted is represented by the product of the intensity of a light beam itself transmitted through each picture element and the transmission time "t" of the light beam. The transmission time "t" is equal to the irradiation time T (t=T) when a liquid crystal mask marker is of the lump irradiating type, but is given as time (t=T/v) resulted by dividing the irradiation time T by the raster speed "v" when it is of the raster irradiating type.

When the current image P1 is rewritten to the next image P2 with the prior art process of grounding the potentials of all of the picture elements, as shown in FIG. 4, the transmittance of the picture element B1 rises later than that of the picture element A1, while the transmittance of the picture element A2 falls later than that of the picture element B2. In other words, such a delay in the rising of the transmittance of the picture element B1 gives rise to a counter afterimage B1, while such a delay in the falling of the transmittance of the picture element A2 give rise to an afterimage A2. Because a high-density energy light beam is irradiated onto the next image P2 without taking into account the foregoing phenomena, the afterimage A2 and the counter afterimage B1 are imprinted on the workpiece surface 6. In addition, as the marking speed increases, the timing Ts to start the irradiation comes closer to the period of rewriting and, therefore, the sharpness of an image imprinted reduces more remarkably due to the occurrence of the afterimage A2 and the counter afterimage B1.

Another new problem can also be seen from FIG. 4. More specifically, when a liquid crystal mask marker is of the lump irradiating type, the afterimage A2 and the counter afterimage B1 occur uniformly. However, when a liquid crystal mask marker is of the raster irradiating type, the afterimage A2 and the counter afterimage B1 are more distinct in the picture elements of the next image P2 on the side where the raster irradiation is started, than in the picture elements thereof on the side where the raster irradiation is ended. Further, tendency analysis for the state of each picture element shows that if the picture element is in a stable state regardless of whether its past state was transparent or opaque, it takes a relatively long time to transit the picture element to the other state. Stated otherwise, if the history of the picture element is unstable or if the picture element is made unstable by cancelling its history, the transition to the other state takes a relatively short time. The image display methods for the liquid crystal mask marker according to the first to third inventions have been achieved based on the above results of analysis.

In the feature of the first invention, the expression "are made transparent" means that both the picture elements A and B, i.e., all of the picture elements, of the current image are turned once to a state transparent to the irradiated light beam. In practice, since the picture elements A of the current image P1 are already in the transparent state, the voltage for only the picture elements B is raised to a value enough to make the picture elements B transparent. Also, the expression "electrodes of all of the picture elements are grounded" means that all of the picture elements are processed in the same manner as the prior art process of grounding the potentials of all of the picture elements. Thus, according to the feature of the first invention, the history of each picture element B in the current image P1 is cancelled, then electrodes of all of the picture elements are grounded or set equipotentially, and thereafter the step of displaying the next image P2 is started.

In the feature of the second invention, the expression "are made opaque" means that both the picture elements A and B, i.e., all of the picture elements, of the current image are turned once to a state opaque to the irradiated light beam. In practice, since the picture elements B of the current image P1 are already in the opaque state, the voltage for only the picture elements A is lowered to a value enough to make the picture elements A opaque. Thus, according to the feature of the second invention, the history of each of the picture elements in the current image P1 is cancelled, then the electrodes of all of the picture elements are grounded or set equipotentially, and thereafter the step of displaying the next image P2 is started.

In the feature of the third invention, the expression "are reversed" means that the voltage for the picture elements A is lowered and the voltage for the picture elements B is raised. At this time, it is not necessarily required to turn the picture elements A from the transparent state to the completely opaque state and turn the picture elements B from the opaque state to the completely transparent state. It is essential that the voltages are merely raised and lowered corresponding to the respective picture elements. Thus, according to the feature of the third invention, the history of each of the picture elements A and B in the current image P1 is cancelled, then the electrodes of all of the picture elements are grounded or set equipotentially, and thereafter the step of displaying the next image P2 is started.

BRIEF DESCRIPTION OF THE DRAWINGS

FIGS. 1 to 3 plot changes in transmittance of light through images and afterimages before and after the rewriting of a display image, as carried out according to the present invention, in which:

FIG. 1 is an analytic graph for a first embodiment,

FIG. 2 is an analytic graph for a second embodiment, and

FIG. 3 is an analytic graph for a third embodiment.

FIGS. 6A and 6B illustrate procedures for rewriting a display image of a liquid crystal mask, in which: FIG. 6A is an explanatory view for the procedures for each of the workpieces, and FIG. 6B is an explanatory view for the procedures for each of the divided image segments within one period of marking time shown in FIG. 6A, and FIGS. 7A to 7C illustrate, for the purpose of explaining a sharpness of the image imprinted, images displayed on the liquid crystal mask and on the workpiece surface, in which.

BEST MODE FOR CARRYING OUT THE INVENTION

Several preferred embodiments of an image display method for a liquid crystal mask marker according to the present invention will be hereinafter described in detail with reference to the accompanying drawings.

Figure 5:
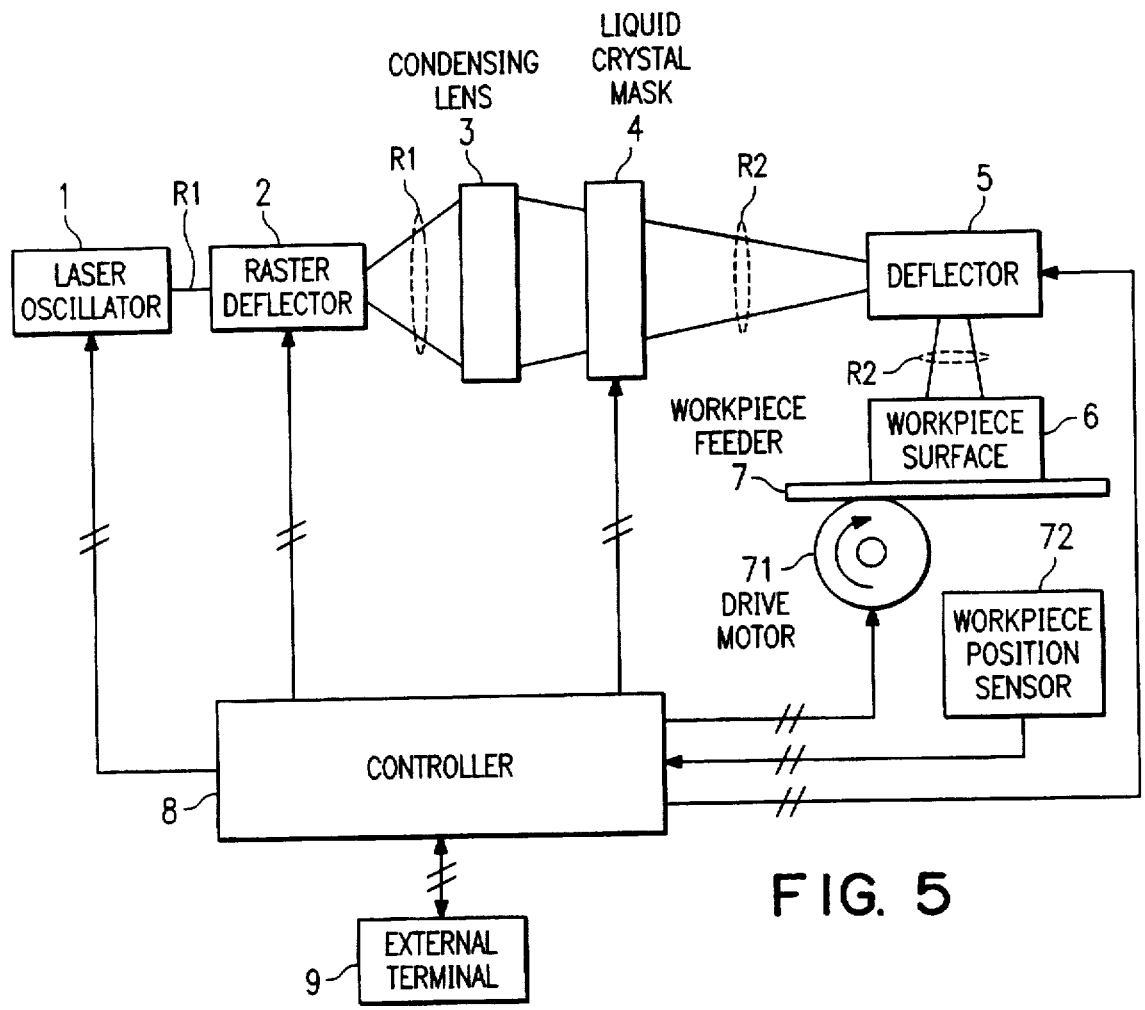
FIG. 5 is a diagram of a liquid crystal mask marker according to an embodiment of the present invention.

FIG. 5 shows a liquid crystal mask marker employed in the first invention. The system arrangement of this marker will be described briefly. A laser beam R1, emitted from a laser oscillator 1, is irradiated in a raster manner onto the image surface of a liquid crystal mask 4 through a deflector 2 for raster irradiation. The term "raster irradiation" means that the thin laser beam R1 is irradiated while being moved successively in the X and Y directions. A laser beam R2, transmitted through the image surface of the liquid crystal mask 4, is then irradiated onto a workpiece surface 6 through a deflector 5. The transmitted laser beam R2 contains information of a mask display image, and this image is imprinted on the workpiece surface 6. The transmitted laser beam R2 is condensed toward the deflector 5 through the liquid crystal mask 4 by a condensing lens 3, placed upstream of the liquid crystal mask 4.

Figure 6A:
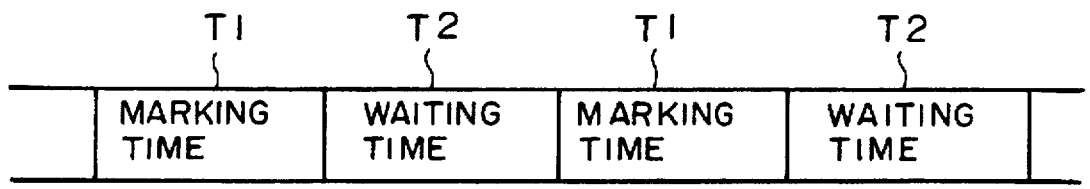
Figure 6B:
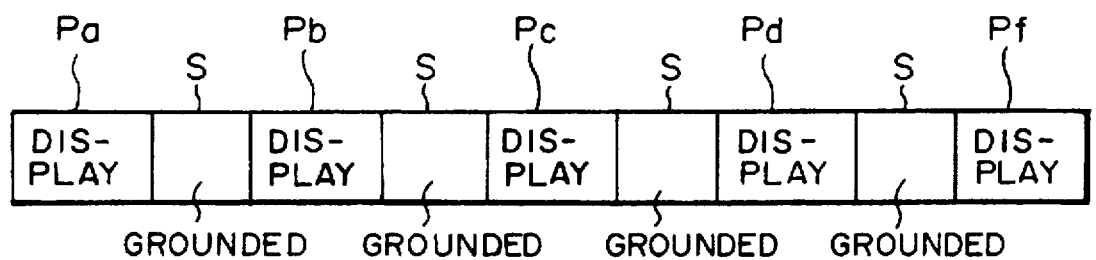
Figure 7A:
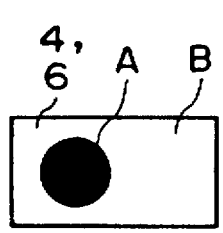
FIG. 7A is an explanatory view of a current image.
Figure 7B:
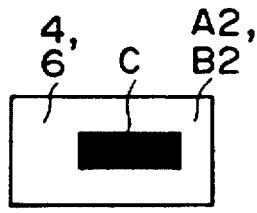
FIG. 7B is an explanatory view of a next image.
Figure 7C:
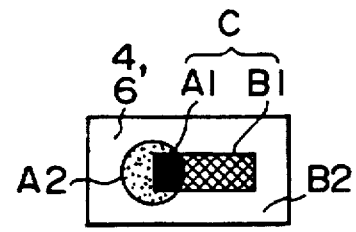
FIG. 7C is an explanatory view of the next image including an afterimage and a counter afterimage.

In the illustrated system example of a liquid crystal mask marker of the raster irradiation type, as shown in FIG. 6B, one entire image P is divided into five image segments Pa to Pf beforehand, and these divided image segments Pa to Pf are displayed by the liquid crystal mask 4 successively. The deflector 5 is operated whenever each image segment is displayed, so that the divided image segments Pa to Pf are imprinted in their respective optimum areas of the workpiece surface 6. After the entire image P has been imprinted (i.e., after the marking time T1), the marker system waits for a next workpiece (waiting time T2) and then repeats the above-explained marking operation on the next workpiece, as shown in FIG. 6A. While switching over to the next workpiece can be performed by the deflector 5, a workpiece feeder 7 is employed for that purpose in this embodiment. Further, as shown in FIG. 5, the marker system includes a controller 8, which is electrically connected to the laser oscillator 1, the deflector 2 for raster irradiation, the liquid crystal mask 4, the deflector 5, a drive motor 71 for the workpiece feeder, and a workpiece position sensor 72, and which controls these components in synchronous relation in accordance with commands from an external terminal 9. The controller 8 also instructs application of voltages to the liquid crystal mask 4 (i.e., applies voltages to the mask and makes it grounded), and adjustment of the applied voltages (i.e., raises and lowers the applied voltages).

It is to be noted that liquid crystal mask markers in which the present invention is employed are not necessarily limited to the liquid crystal mask marker of the raster irradiation type described above as an example. Referring to FIG. 5, a liquid crystal mask marker of the lump irradiation type is obtained by replacing the deflector 2 for raster irradiation with a simple magnifying lens. Further, regardless of whether the marker is of the raster irradiation type or the lump irradiation type, and regardless of whether the deflector 5 is provided or not, the liquid crystal mask marker can be designed to imprint an entire image as a whole rather than dividing the entire image into a plurality of image segments as explained above. In such a case, the procedures shown in FIG. 6B are not required. Thus, it is convenient for understanding to regard "marking time T1" in FIG. 6A as "display" in FIG. 6B and "waiting time T2" in FIG. 6A as "grounded" plus "waiting time".

Figure 4:
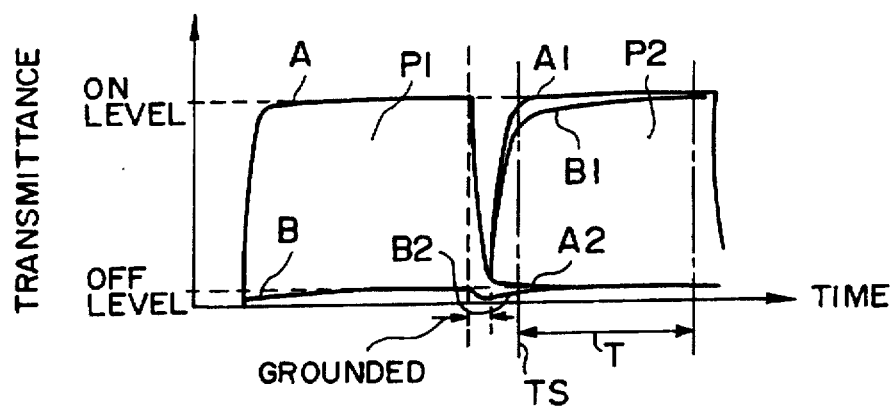
FIG. 4 is an analytic graph plotting changes in transmittance of light through images and afterimages before and after a rewriting of a display image, as carried out according to the prior art.

In the first embodiment of the liquid crystal mask marker which can be practiced in various forms, the control performed by the controller 8 is, for example, as follows. The construction, operation and advantages of the first embodiment will be described below with reference to FIG. 1 in which there is shown an analytic graph. Note that the reference numerals in FIG. 1 correspond to those in FIG. 4. When the display image of the liquid crystal mask 4 is rewritten, the controller 8 outputs signals to the liquid crystal mask 4 to raise the voltage for the opaque picture elements B of the current image P1 once to a value large enough to make the picture elements B transparent, then ground or set all of the picture elements A and B equipotentially, and thereafter start the step of displaying the next image P2. By raising the voltage for the picture elements B to a value large enough to make them transparent, the history of each picture element B is cancelled. Here, the expression "raising the voltage for the picture elements B" does not mean that the transmittance of the picture elements B is always increased to the same value as the transmittance of the picture elements A. Of course, if the voltage for the picture elements B is raised to the same voltage as for the picture elements A and then left to stand for a while, both the picture elements A and B will have the same transmittance. Incidentally, it is not always required to raise the voltage for the picture elements B to the same voltage as for the picture elements A.

Figure 1:
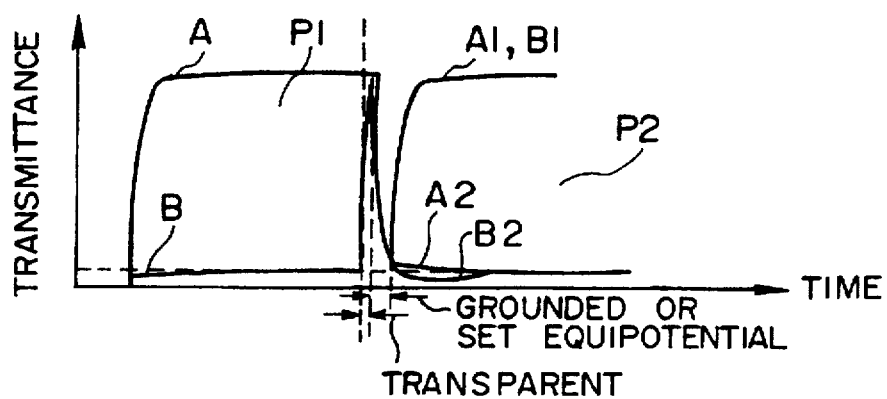

With the first embodiment described above, as will be seen from the next image P2 in FIG. 1, the afterimage A2 remains, but the counter afterimage B1 is eliminated, resulting in a higher sharpness of the image imprinted. In addition, since transmittance values of the transparent areas A1 and B1 rise substantially at the same rate, the timing to irradiate the laser beam is easier to set, and hence the marking speed can be increased with certainty.

Next, a second embodiment of the image display method for the liquid crystal mask marker according to the present invention will be described. This second embodiment is different from the first embodiment in the display method for rewriting the display image.

Figure 2:
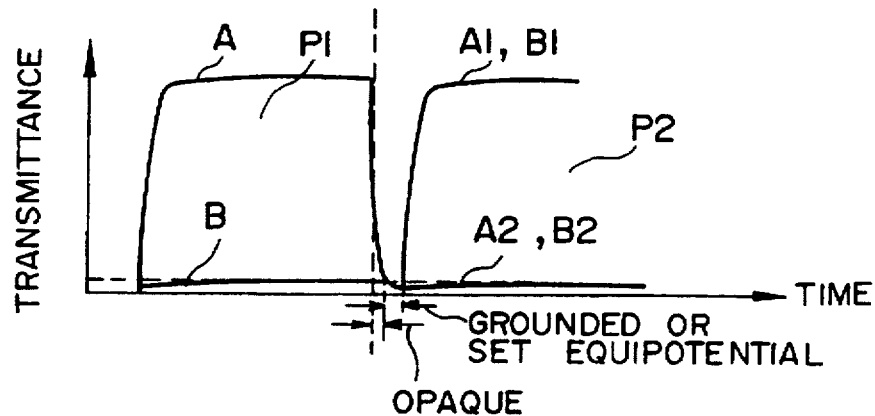

Referring to FIGS. 2 and 5, when the display image of the liquid crystal mask 4 is rewritten, the controller 8 outputs signals to the liquid crystal mask 4 to lower the voltage for the transparent picture elements A of the current image P1 once to a value low enough to make the picture elements A opaque, then ground or set all of the picture elements A and B equipotentially, and thereafter start the step of displaying the next image P2. In this embodiment, at the timing at which the transmittance of the picture elements A is reduced down to the same level as the transmittance of the picture elements B, all of the picture elements A and B are grounded, after which the voltages for displaying the next image P2 are raised. By so making all of the picture elements A and B grounded, the history of each of the transparent picture elements A and the opaque picture elements B in the current image P1, i.e., the history of the current image P1 itself, is cancelled. Note that, also in this embodiment, it is not always required to lower the voltage for the picture elements A to the same voltage as for the picture elements B.

With the second embodiment thus constituted, as will be seen from the next image P2 in FIG. 2, the afterimage A2 and the counter afterimage B1 are both eliminated, resulting in a higher sharpness of the image imprinted. In addition, since transmittance values of the transparent areas A1 and B1 rise substantially at the same rate, the timing to irradiate the laser beam is easier to set, and hence the marking speed can be increased. Incidentally, the prior art process of grounding the potentials of all of the picture elements can also produce a similar condition to that shown in FIG. 2 obtainable with this embodiment. With the prior art process, however, because a liquid crystal acts as one kind of capacitor, it takes a longer time to establish the same condition as shown in FIG. 2 than with this embodiment. In short, this embodiment can shorten a period of time required for establishing the condition shown in FIG. 2.

Next, a third embodiment of the image display method for the liquid crystal mask marker according to the present invention will be described. This third embodiment is also different from the foregoing embodiments in the display method for rewriting the display image.

Figure 3:
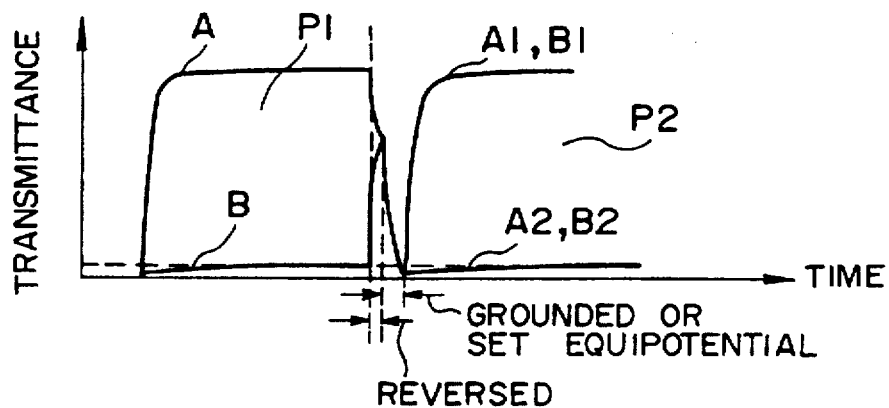

Referring to FIGS. 3 and 5, when the display image is rewritten, the controller 8 outputs signals to the liquid crystal mask 4 to lower the voltage for the picture elements A of the current image P1 and raise the voltage for the picture elements B thereof, then ground or set all of the picture elements A and B equipotentially, and thereafter start the step of displaying the next image P2. By lowering the voltage for the picture elements A and raising the voltage for the picture elements B, the current image is reversed. Preferably, the voltage for the picture elements A is lowered to a level at which the picture elements A become opaque, and the voltage for the picture elements B is raised to a level at which the picture elements B become transparent. Also, with all of the picture elements A and B grounded or set equipotentially, the history of each picture element in the current image P1 is cancelled. Note that the lowered voltage for the picture elements A is not always required to be the same as the raised voltage for the picture elements B. In this embodiment, when the voltages are lowered and raised respectively to such an extent that both the picture elements A and B have predetermined transmittance values, all of the picture elements are made grounded, followed by starting the step of displaying the next image P2.

With the third embodiment thus constituted, as will be seen from the next image P2 in FIG. 3, the afterimage A2 and the counter afterimage B1 are both eliminated, resulting in a higher sharpness of the image imprinted. Accordingly, the marking quality can be prevented from deteriorating at joints between divided images. This advantage of preventing a deterioration in the marking quality can also be attained similarly in the above first and second embodiments as well. In addition, since transmittance values of the transparent areas A1 and B1 rise substantially at the same rate, the timing to irradiate the laser beam is easier to set, and hence the marking speed can be increased.

Three embodiments of the present invention have been described above in detail. Comparing the first to third embodiments, although resulting images are different in sharpness to some extent from each other, any of the embodiments can raise the transmittance values of the transparent areas A1 and B1 substantially at the same rate. In other words, the timing Ts to start irradiation of a high-density energy light beam can be controlled, taking into account the conditions required to achieve a high marking speed and a high image sharpness. As a result, the marking speed and the sharpness of an image imprinted can be both controlled in a desired manner. Additionally, it is a matter of course that the present invention is not limited to a liquid crystal mask marker with a high marking speed, but is also applicable to conventional liquid crystal mask markers.

INDUSTRIAL APPLICABILITY

The present invention is usefully put into practice as an image display method for a liquid crystal mask marker which can control the processing of an afterimage, the processing of a counter afterimage, and the irradiation timing of a high-density energy light beam, and which can also display an image of a higher sharpness even when the marking speed is high.

We claim:

1. In an image imprinting method of utilizing a liquid crystal mask having electrodes for a plurality of picture elements, said method comprising the steps of:
   (a) displaying on a liquid crystal mask a first image to be imprinted on a surface of a workpiece, said first image having some picture elements which are transparent and some picture elements which are opaque;
   (b) irradiating a light beam onto said liquid crystal mask on which is displayed said first image;
   (c) irradiating a light beam, transmitted through said liquid crystal mask, onto said workpiece surface, thereby imprinting said first image on a workpiece surface;
   (d) displaying on said liquid crystal mask a second image to be imprinted on a surface of a workpiece, said second image having some picture elements which are transparent and some picture elements which are opaque;
   (e) irradiating a light beam onto said liquid crystal mask on which is displayed said second image;
   (f) irradiating a light beam, transmitted through said liquid crystal mask, onto said workpiece surface, thereby imprinting said second image on a workpiece surface;
   the improvement comprising:
   after step (c) and prior to step (d), the steps of:
   (i) performing at least one of:
      (1) making all of the opaque picture elements of the first image to become transparent, and
      (2) making all of the transparent picture elements of the first image to become opaque,
   (ii) then making the electrodes of all of the picture elements of the first image to be grounded or set equipotentially, and
   (iii) thereafter starting step (d).

2. A method in accordance with claim 1, wherein said step of performing comprises making all of the opaque picture elements of said first image to become transparent.

3. A method in accordance with claim 2, wherein the opaque picture elements of said first image are made transparent by raising a voltage on the opaque picture elements of said first image to a value large enough to make them transparent.

4. A method in accordance with claim 3, wherein the value to which the voltage on the opaque picture elements of said first image is raised is not the same as a voltage on the transparent picture elements of said first image.

5. A method in accordance with claim 3, wherein the value to which the voltage on the opaque picture elements of said first image is raised is the same as a voltage on the transparent picture elements of said first image.

6. A method in accordance with claim 2, wherein the opaque picture elements of said first image are made transparent by raising a voltage on the opaque picture elements of said first image to a value large enough to make them transparent.

7. A method in accordance with claim 1, wherein said step of performing comprises making all of the transparent picture elements of said first image to become opaque.

8. A method in accordance with claim 7, wherein the transparent picture elements of said first image are made opaque by lowering a voltage on the transparent picture elements of said first image to a value low enough to make them opaque.

9. A method in accordance with claim 8, wherein the value to which the voltage on the transparent picture elements of said first image is lowered is not the same as a voltage on the opaque picture elements of said first image.

10. A method in accordance with claim 8, wherein the value to which the voltage on the transparent picture elements of said first image is lowered is the same as a voltage on the opaque picture elements of said first image.

11. A method in accordance with claim 7, wherein said step of making the electrodes of all of the picture elements of the first image to be grounded or set equipotentially is started when a transmittance of the transparent picture elements of said first image is reduced to a level of transmittance of the opaque picture elements of said first image.

12. A method in accordance with claim 1, wherein said step of performing comprises making all of the opaque picture elements of said first image to become transparent and making all of the transparent picture elements of said first image to become opaque, to create a reversal of said first image.

13. A method in accordance with claim 12, wherein the opaque picture elements of said first image are made transparent by raising a voltage on the opaque picture elements of said first image to a value large enough to make them transparent, and wherein the transparent picture elements of said first image are made opaque by lowering a voltage on the transparent picture elements of said first image to a value low enough to make them opaque.

14. A method in accordance with claim 13, wherein the value to which the voltage on the opaque picture elements of said first image is raised is not the same as the value to which the voltage on the transparent picture elements of said first image is lowered.

15. A method in accordance with claim 13, wherein the value to which the voltage on the opaque picture elements of said first image is raised is the same as the value to which the voltage on the transparent picture elements of said first image is lowered.

16. A method in accordance with claim 12, wherein said step of making the electrodes of all of the picture elements of the first image to be grounded or set equipotentially is started when a transmittance of the transparent picture elements of said first image is reduced to a level to which a transmittance of the opaque picture elements of said first image is raised.

17. A method in accordance with claim 12, wherein said step of making the electrodes of all of the picture elements of the first image to be grounded or set equipotentially is started when a transmittance of the transparent picture elements of said first image is reduced to a predetermined level and a transmittance of the opaque picture elements of said first image is raised to a predetermined level.

18. A method in accordance with claim 1, wherein said liquid crystal mask is part of a liquid crystal mask marker employing raster irradiation.

19. A method in accordance with claim 1, wherein said liquid crystal mask is part of a liquid crystal mask marker employing lump irradiation.

20. A method in accordance with claim 1, wherein said first and second images are separate segments of an entire image to be imprinted on a single workpiece.

* * * * *